Figure 1:
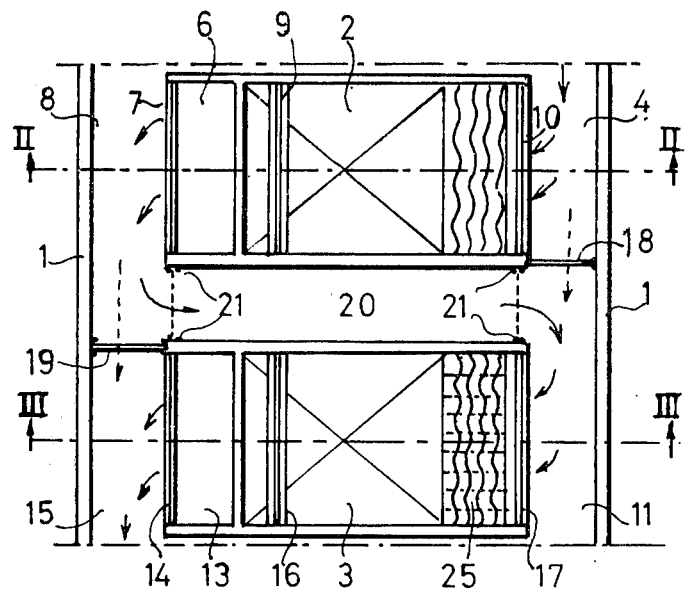

United States Patent [19]

Pielkenrood

[11] 4,067,813

[45] Jan. 10, 1978

[54] COMPOUND SEPARATION DEVICE

[75] Inventor: Jacob Pielkenrood, Krommenie, Netherlands

[73] Assignee: Pielkenrood-Vinitex B.V., Assendelft, Netherlands

[21] Appl. No.: 568,847

[22] Filed: Apr. 17, 1975

Related U.S. Application Data

[63] Continuation of Ser. No. 412,726, Nov. 5, 1973, abandoned.

[51] Int. Cl.² ............... B01D 21/02; C02B 9/00; C02C 1/26
[52] U.S. Cl. ....................... 210/322; 210/521
[58] Field of Search .......... 210/521, 522, 201, 253, 210/294, 322, 519, 532, 320, 524, 336, 170, 239, 264, 83, 84, 513; 417/62; 137/599

[56] References Cited

U.S. PATENT DOCUMENTS

| Re. 27,346 | 4/1972 | Naylor | 210/521 |
|---|---|---|---|
| 367,308 | 7/1887 | MacNab | 210/521 |
| 863,168 | 8/1907 | Griswald | 210/521 |
| 1,190,863 | 7/1916 | Corne et al. | 210/521 |
| 2,761,387 | 9/1956 | Gaubatz | 417/62 |
| 3,346,122 | 10/1967 | Cornelissen | 210/522 |
| 3,666,112 | 5/1972 | Pielkenrood et al. | 210/521 |
| 3,797,668 | 3/1974 | Pielkenrood et al. | 210/522 |

Primary Examiner—Tim R. Miles
Assistant Examiner—Frank Sever
Attorney, Agent, or Firm—George F. Smyth

[57] ABSTRACT

A compound separation device including at least two separators each comprising a plurality of inclined separation passages defined between inclined corrugated plates or the like, connecting means being provided allowing to interconnect said separators selectively in series or in parallel.

11 Claims, 3 Drawing Figures

COMPOUND SEPARATION DEVICE

This application is a continuation of application Ser. No. 412,726, filed on Nov. 5, 1973 and assigned to the same assignee, now abandoned.

In U.S. patent (application) Ser. No. 50,282 (99°) now abandoned of the same applicant a compound separation device for removing suspended components from a liquid is described, which device comprises a number of separators which are arranged in a basin and which include separation passages defined between corrugated plates or troughs, which separators are inclined in respect of the horizontal plane, the basin being provided with sedimentation and/or flotation compartments for collecting precipitating or floating components respectively, which separators are arranged in said basin in such a manner that the outlet of a first and the inlet of a second separator open into a common connecting means, and the liquid to be treated is forced to flow successively through these separators.

In this manner a series connection of two or more separators is obtained, so that the components which have not yet been separated in the first separator can be separated in the second one.

Such a compound device is, however, not always satisfying the wishes of the users. For it is not always necessary to comply with the most stringent separation requirements, but, nevertheless, the possibility of using the multiple separation mentioned above should remain open as soon as this would be required.

It is possible, for instance, that when designing a purification device it is not sure in which way the Government regulations will develop and/or how the character of liquids to be treated in the device may change in future, and it is also possible that the components present in the liquids to be treated are not always as easily separable. A series connection will lead to an increased flow resistance, so that it will preferably not be used if it can be avoided.

The invention provides an improvement of such a device which allows an adaptation to the wishes of the user, which device is characterised in that the connection between a first and a second separator is provided with closing and/or switching means enabling to interrupt the connection between the outlet of the first and the inlet of the second separator, and, instead thereof, to connect the inlet of the first to that of the second separator, and the outlet of the first to that of the second separator.

The invention will be elucidated below by reference to the drawing, showing in:

FIG. 1 a partial top view of an embodiment of the device of the invention; and

Figure 2:
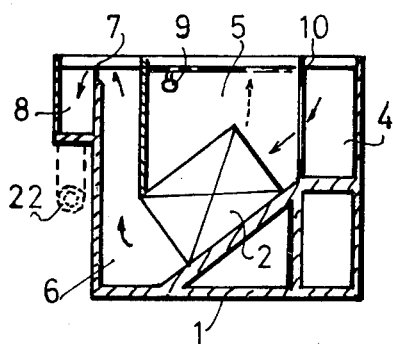
Figure 3:
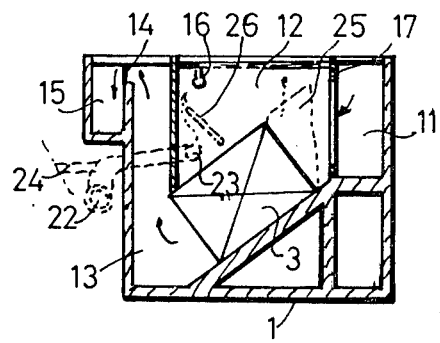

FIG. 2 and 3 cross-sections on lines II—II and III—III resp. of FIG. 1.

The compound device shown comprises a basin 1 which, in the usual manner, is divided by means of partitions into a plurality of separate compartments. In FIG. 1 two of such compartments are shown, in which, respectively, a first plate separator 2 and a second separator 3 are positioned. Instead of one first and one second separator a larger number thereof can be arranged in parallel. In the embodiment shown the separators are adapted to separate, in the first place, floating components, but the device can also be made suitable in a known manner for mainly separating precipitating components.

A supply duct 4 is separated from the basin 1 by means of a longitudinal partition, which duct communicates with a supply or flotation chamber 5 of the first separator 2 (or with the corresponding chambers of a set of first separators). The output of this separator which is situated at a lower level communicates, by means of a discharge chamber 6 and an overflow weir 7, with a first discharge duct 8. In the upper part of the flotation chamber 5, where a layer of floating components is floating on the liquid, a discharge tube 9 is arranged which is, at its upper side, provided with an aperture through which these floating components can be removed. If necessary a slotted baffle 10 is arranged between the duct 4 and the chamber 5, having a closed upper part so as to prevent the floating components from spreading into the duct 4. For this baffle reference can be made to U.S. patent (application) Ser. No. 146,207 (1971), now abandoned.

Aligned with the first supply duct 4 a second supply duct 11 is situated, communicating with the supply and flotation chamber 12 of the second separator 3 (or with the corresponding chambers of a series of second separators). The opposite end of this separator connects with a discharge chamber 13 communicating, by means of an overflow weir, with a second discharge duct 15 which is aligned with the first discharge duct 8. In the upper part of the flotation chamber 12 a tube 16 corresponding to the tube 9 is arranged which may communicate with the latter and, furthermore, a slotted baffle 17 may again be present between the duct 11 and the chamber 12.

The first supply duct 4 is separated from the second one by means of a removable baffle 18, and also the first discharge duct 8 is separated from the second discharge duct 15 by means of a similar baffle 19. Between the first discharge duct 8 and before the baffle 19, on the one hand, and the second supply duct 11 beyond the first baffle 18, on the other hand, a connecting duct 20 is situated.

In the situation shown the liquid to be treated flows, successively, from the duct 4 through the separator 2 towards the duct 8, subsequently through the connecting duct 20 and the second supply duct 11 towards the second separator 3, and, finally, through the second discharge duct 15 towards a discharge for the treated liquid. The floating components separated in both separators are, as mentioned above, removed through the tubes 9 and 16.

In the connecting duct 20 guides 21 are provided into which the baffles 18 and 19, after being removed from similar guides in the ducts 4 and 15, can be fitted. In that case the ducts 4 and 11 on the one hand, and the ducts 8 and 15 on the other hand, can be interconnected, and the connecting duct is closed. Both separators 2 and 3 are, then, no longer connected in series, but are then connected in parallel, so that the flow capacity of the assembly is increased.

In FIGS. 2 and 3 another embodiment is indicated with dotted lines. In that case the duct 20 is absent, but instead thereof a connecting conduit 22 is provided communicating, at one end, with the duct 8, and terminating, at the opposite end, in a nozzle 23, the latter opening above the separator 3 into the flotation chamber 12. This nozzle has, for instance, the form of a tube extending through a substantial part of the width of the chamber 12, and having a longitudinal slot directed in the desired outflow direction. This conduit is provided with a suitable valve enabling this conduit to be closed when it is required to change to the parallel connection. One or more tubes 24 communicate with the conduit 22 for injecting air and/or separation promoting agents for being mixed with the liquid. This can be important/for preparing difficultly separable components, which have not been separated in the first separator, on separation in the second separator.

In this second embodiment the liquid to be treated flows over the separator 3 towards the inlet thereof. The liquid flow crosses the separated components emerging from the separator at this side. Sometimes it may be advisable to provide, at the inlet side, guiding ducts 25 connecting the crests of the corrugated passages in this separator and guiding the separated components upwards. The liquid flow originating from the nozzle 23 will, then, flow between these ducts, and, if necessary, additional guiding baffles can be provided to that end. For these guiding ducts reference is made to the older U.S. Pat. No. 5,666,111 of the same applicant.

If required the slotted baffle 17 can be removed or closed. In the latter case it is also possible to use the duct 11 for removing the flotating components which are, then, discharged over the upper edge of a suitable baffle corresponding to the baffle 17, for instance by means of a scraper or the like.

Preferably the nozzle 23 is situated as low as possible in the corner of the floatation chamber 12. Especially in the case of a relatively long slotted tube 23, it is favourable to use a slot which gradually widens in the sense of liquid flow so as to obtain a substantially uniform flow distribution along the whole length of the slot. Furthermore it will be favourable to provide an inclined plate 26 in front of the nozzle 23 forcing the emerging liquid low upwards. In this manner the generation of revolving liquid flows or larger vortices is prevented. In the case of discharge means situated near the baffle 17 the liquid flows generated by the plate 26 will drive the components floating on the liquid surface towards said discharge means. Preferably the plate 26 is adjustable, and also the nozzle 23 may be made adjustable, so as to be able to direct the liquid flow in the most favourable manner.

The overflow weirs 7 and 14 are preferably adjustable, in particular because the static pressure gradient in the case of the series connection will be different from that in the case of the parallel connection.

It will be clear that many modifications are possible. The injection of air or separation promoting agents can also be done in the duct 20. Instead of open supply and discharge ducts also tube conduits and adapted valves can be used. When, instead of a first and a second separator, a set of first separators connected in parallel and, respectively, a set of second separators connected in parallel are used, the number of first separators will, generally, be larger than the number of second separators, since the amounts of liquid to be led through the second separators will be smaller because of the removal of a substantial part of the separable components in the first separators.

For removing precipitating components, separators will generally be used having an inclination which is opposite to the inclination of the separators shown, but also in this case the compound device can be constructed in a similar way.

I claim:

1. In a compound separation device having a plurality of separators for removing suspended components from a liquid, including a basin and first and second separators which are arranged in said basin, said separators including corrugated plates defining separation passages therebetween, means mounting the separators at an inclined orientation relative to the horizontal, each separator including an inlet and an outlet and means to remove components which are separated, the basin including inlet means and outlet means and means forming compartments for collecting components separated from the liquid, said inlet means further comprising first and second supply ducts and said outlet means further comprising first and second discharge ducts, the inlet of said first separator being connected to said first supply duct and the outlet of said first separator being connected to said first discharge duct, the inlet of said second separator being connected to said second supply duct and the outlet of said second separator being connected to said second discharge duct, said first supply duct supplying the liquid to be treated, said second discharge duct providing a discharge for the treated liquid, common connecting means to provide a passage for liquid flow from the outlet of said first separator to the inlet of said second separator, the improvement comprising:

flow switching means associated with said common connecting means and operable in a first position to effect series flow from the outlet of said first separator to the inlet of said second separator and operable in a second position to block the series flow and to effect parallel flow from said inlet means to the inlets of each of said first and second separators and to permit the flow from the outlet of the first separator to be merged with the flow from the outlet of the second separator, said flow switching means further comprising first closing means separating in said first position said first and second supply ducts from one another and second closing means separating in said first position said first and second discharge ducts from one another, such that said first discharge duct communicates with said second supply duct via said common connecting means to produce serial flow when said flow switching means are in said first position, said first closing means closing off in said second position said common connecting means from said second supply duct and joining said first and said second supply ducts, said second closing means closing off in said second position said common connecting means from said first discharge duct and joining said first and said second discharge ducts such that parallel flow is effected when said flow switching means are in said second position.

2. The improvement of claim 1 wherein said first and second supply and discharge ducts are open gutters situated at substantially the same level, and wherein said first and second closing means are baffles, and further comprising means for selectively positioning said baffles in their first and second positions.

3. The improvement of claim 2 wherein said common connecting means further comprise an open gutter selectively closed off by said baffles in their second positions.

4. The improvement of claim 1 wherein said common connecting means is a tube conduit provided with a valve.

5. The improvement of claim 4 wherein said tube conduit directly opens into the inlet of said second separator.

6. The improvement of claim 5 wherein said tube conduit terminates in a nozzle.

7. The improvement of claim 6 further comprising an inclined plate positioned in the discharge of said nozzle.

8. The improvement of claim 6 wherein said nozzle is adjustable in direction.

9. The improvement of claim 1 further comprising means for introducing separation promoting agents into said common connecting means.

10. In a compound separation device having a plurality of separators for removing suspended components from a liquid, including a basin and first and second separators which are arranged in said basin, said separators including corrugated plates defining separation passages therebetween, means mounting the separators at an inclined orientation relative to the horizontal, each separator including an inlet and an outlet and means to remove components which are separated, the basin including first and second supply ducts and first and second discharge ducts, the ducts being open channels situated at substantially the same level, the inlet of said first separator being connected to said first supply duct and the outlet of said first separator being connected to said first discharge duct, the inlet of said second separator being connected to said second supply duct, and the outlet of said second separator being connected to said second discharge duct, said first supply duct supplying the liquid to be treated, said second discharge duct supplying a discharge for the treated liquid, a common connecting channel to provide a passage for liquid flow from the outlet of said first separator to the inlet of said second separator, and wherein the liquid to be treated is forced to flow successively through the separators, the improvement comprising first and second baffles, said first baffle separating in a first position said first and second supply ducts from one another, and said second baffle separating in a first position said first and second discharge ducts from one another such that said first discharge duct communicates with said second supply duct via said common connecting channel to produce serial flow when said first and second baffles are in said first position, said first baffle closing off in a second position said common connecting channel from said second supply duct merging said first and second supply ducts, said second baffle closing off in said second position said common connecting channel from said first discharge duct and merging said first and said second discharge ducts such that parallel flow is effected when said baffles are in said second position.

11. The improvement of claim 10 wherein said common connecting channel is also an open channel adapted to be closed by said first and second baffles in their second position after said baffles have been removed from their first positions within said supply and discharge ducts.

* * * * *